(12) United States Patent
Morgan (10) Patent No.: US 8,136,293 B2
(45) Date of Patent: Mar. 20, 2012

(54) METHOD AND DEVICE FOR A CONFIGURABLY SUPPORTING TRELLIS OR BARRIER MATERIAL

(76) Inventor: Wayne Morgan, Soquel, CA (US)

( * ) Notice: Subject to any disclaimer, the term of this patent is extended or adjusted under 35 U.S.C. 154(b) by 0 days.

(21) Appl. No.: 12/870,809

(22) Filed: Aug. 28, 2010

(65) Prior Publication Data

US 2011/0113684 A1     May 19, 2011

Related U.S. Application Data

(63) Continuation-in-part of application No. 12/590,750, filed on Nov. 13, 2009, and a continuation-in-part of application No. 12/660,054, filed on Feb. 19, 2010.

(51) Int. Cl.
*A01G 17/06* (2006.01)
(52) U.S. Cl. .................... 47/47; 47/70; 52/155
(58) Field of Classification Search ............... 47/22.1, 47/31, 20.1, 70, 44–47; 52/155
See application file for complete search history.

(56) References Cited

U.S. PATENT DOCUMENTS

| | | | | |
|---|---|---|---|---|
| 202,179 | A * | 4/1878 | Lennon | 52/155 |
| 645,372 | A * | 3/1900 | Paldi | 52/152 |
| 1,153,380 | A * | 9/1915 | Fussell | 52/155 |
| 1,263,132 | A * | 4/1918 | Sharpe | 52/155 |
| 2,125,204 | A * | 7/1938 | Shrewsbury | 47/47 |
| 3,004,366 | A | 10/1961 | Jaspert | |
| 6,014,837 | A | 1/2000 | Morgan | |
| 6,088,953 | A | 7/2000 | Morgan | |
| 7,377,020 | B1 | 5/2008 | Bartling et al. | |
| 2006/0236620 | A1 | 10/2006 | LaCrosse | |
| 2006/0243340 | A1 | 11/2006 | Wheeler et al. | |
| 2007/0062109 | A1* | 3/2007 | Jolley | 47/47 |
| 2008/0271388 | A1 | 11/2008 | Bayly et al. | |

FOREIGN PATENT DOCUMENTS

| | | |
|---|---|---|
| CH | 443 768 | 2/1968 |
| DE | 36 28 634 C1 | 10/1987 |
| DE | G 92 16300 | 4/1993 |
| FR | 05 01227 | 8/2006 |
| GB | 458514 | 12/1936 |

* cited by examiner

*Primary Examiner* — Kristen C Hayes
(74) *Attorney, Agent, or Firm* — Patrick Reilly; Colin Fowler (57) ABSTRACT

A method and device for supporting a string and/or a sheet of material, such as a rope, a length of twine, a trellis netting or a barrier material is provided. A ground anchored device includes a rigid post and two or more flexible arms. The arms may be configured to support two or more sheets of material, wherein the sheets of material may further support plant growth. Alternately or additionally, one or more arms may be positioned to maintain string optionally bearing flags and/or barrier material to further discourage intrusion by animals. Horizontal lines may be extended from a plurality of devices to even further discourage intrusion by animals and/or to support the barrier material.

9 Claims, 10 Drawing Sheets

METHOD AND DEVICE FOR A CONFIGURABLY SUPPORTING TRELLIS OR BARRIER MATERIAL

CO-PENDING U.S. NONPROVISIONAL PATENT APPLICATIONS

The present patent application is a Continuation-in-Part of the U.S. Nonprovisional patent application Ser. No. 12/590,750 titled DEVICE FOR SUPPORTING A PLANT, FENCE OR OBJECT filed on Nov. 13, 2009 by inventor Wayne Morgan, and U.S. Nonprovisional patent application Ser. No. 12/660,054 titled DEVICE AND METHOD FOR SUPPORTING SHEET MATERIAL as filed on Feb. 19, 2010. These co-pending U.S. Nonprovisional patent application Ser. No. 12/590,750 and Ser. No. 12/660,054 are each hereby incorporated in their entirety and for all purposes. The present patent application claims benefit of the both the priority date of Nov. 13, 2009 of the co-pending U.S. Nonprovisional patent application Ser. No. 12/590,750 and the priority date of Feb. 19, 2010 of the co-pending U.S. Nonprovisional patent application Ser. No. 12/660,054.

FIELD OF THE INVENTION

The present invention relates to the field of plant protection and growth. The method of the present invention more particularly relates to the emplacement and support of string trellis netting, sheet material, solar panel sheets, fences and/or barrier material to enable and preserve plant growth and/or discourage animal access to plants.

BACKGROUND OF THE INVENTION

Trellis structures are used in the prior art to support the growth of a wide variety of plants. The positioning and long-term stability of deployed trellis netting is therefore a significant factor in such deployments. Protecting plants from damage by animals is an additional concern of many gardeners and agricultural ventures.

It is also of interest to many gardeners and agricultural workers to position trellis netting relative to the path of the sun, and to vary the positioning of the trellis netting over time. Yet the prior art fails to provide for portable, ground anchor systems that enable the positioning of trellis netting in a given location and allow adjustment of the trellis netting position after an initial deployment of the ground anchored system.

In additional widely felt concern, free roaming herbivores routinely damage plants and agricultural properties in their quest to reach edible plants. In particular, wild deer annually wreak hundreds of millions of dollars in damage to landscaping and gardens by eating and trampling plants.

Deer also consume significant amounts of agricultural products. It is not unusual for an adult male deer to eat over five pounds of food per day. This rate of consumption can result in serious economic degradation of the yield of an agricultural property. In addition, deer can severely and permanently damage prairies and wooded area and even cause an extinction of certain plant species within their grazing range.

While the market for deer barriers and barrier material measures in the billions of dollars annually, the willingness and ability of many consumers to erect deer fences is closely related to the purchase price, ease of installation and durability of deer barrier products and components. The prior art fails to offer solutions that protect plants from damage and areas from intrusion by deer while optimally reducing costs of materials acquisition and increasing ease of barrier installation.

In another area of need, it is sometimes desirable to deploy sun-shading materials and protective sheets that protect plants and seedlings from sun damage and/or from exposure to inclement weather conditions. Yet the prior art fails to provide support structures that optimally enable the positioning of sun-shading materials and protective sheets above plants and seedlings over a wide range of plant growth bed or site conditions.

In yet another area of need, solar energy collection fabrics and panels are becoming increasingly available at financially attractive price points for use by consumers in a wide variety of geography and ground conditions. Yet the prior art fails to provide support structures that optimally enable the support of solar energy collection devices over exposed earth or broken ground.

There is therefore a long-felt need to provide improved methods and devices for both protecting plants from damage by animals and deploying trellis netting and other sheet materials, such as solar energy collection fabric, with ground anchored devices that enable the reorientation of the deployed trellis netting or sheet materials without needing to relocate an anchored device.

SUMMARY OF THE INVENTION

This and other objects of the present invention are made obvious in light of this disclosure, wherein a fencing device is provided that includes a post coupled with at least two flexible arms. The post includes a post length and an anchor section. The flexible arms are coupled to the post length proximal to a striking end of the post length, wherein the striking end is located distal from the post anchor section. The striking end is positioned to enable a user to deliver force to the post and thereby drive the anchor section into a resistive medium, such as a ground surface or soil. The flexible arms may be attached to the post by means of welding, pressure fitting or other suitable coupling means known in the art.

A trellis netting and/or a sheet material may be attached to distal ends of the flexible arms and may extend from a ground plane wherein the anchor section is positioned. An attachment tool, such as a garden staple, may be applied to hold the trellis netting or sheet material in position relative to the ground surface, whereby the trellis netting or sheet material is further secured to the ground surface. Additionally or alternatively, one or more flexible arms may be coupled with an element that extends into the ground surface and thereby stabilizes the coupled arm.

Alternatively or additionally, a solar energy collection panel or fabric may be coupled to and supported by the flexible arms. Further alternatively or additionally, a plant shading material may be coupled to and supported by the flexible arms. Even further alternatively or additionally, a material suitable to protect a plant or seedling from weather conditions may be coupled to and supported by the flexible arms.

The post may include one or more separate elongate elements, such as metallic rebar. The anchor section may be formed of two or more tines of separate elongate elements, wherein the post lengths are rigidly attached to maintain a parallel orientation with a same elongate axis. The tines of the post may be configured to splay away from the elongate axis when each tine is forced into the ground or other medium.

One or more flexible arms may be reconfigurable to extend away from the striking end of the post within a range from zero degrees to 180 degrees from an elongate axis of the elongate post. Each arm may extend from less than one foot to more than six feet from the post. The flexible arms are preferably no longer than the post length. One or more flexible arms may alternatively or additionally be made of metallic rebar.

In one alternate preferred embodiment of the present invention, a trellis netting sheet may be coupled at a top edge to a first flexible arm, and also be coupled at a bottom edge to an alternate flexible arm. Both flexible arms may be positioned and repositioned relative to the sun or other light source or structure in order to optimize the growth or protection of a plant.

In another alternate preferred embodiment of the method of the present invention, a separate trellis netting sheet may individually be attached to separate flexible arms, wherein each trellis netting sheet is separately coupled with a ground surface by a garden staple or hook device.

In another alternate preferred embodiment of the method of the present invention, one or more flexible arms may be oriented horizontally or vertically to position a liner element, such as a string, that is made visible to discourage deer and other animals from jumping into an area of plant growth. In particular a plurality of devices may be positioned to mutually support a length of string wherein at least one flexible arm each device is positioned horizontally and away from a protected area, and the string is attached at a distal point of each arm. The string may have flags or other material attached to increase the visibility of the string to an animal.

The foregoing and other objects, features and advantages will be apparent from the following description of aspects of the present invention as illustrated in the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 202,179 (Inventor: Lennon, S. N.; Issued on Apr. 9, 1818) titled "Improvement in fence-posts"; U.S. Pat. No. 1,153,380 (Inventor: Fussell, J. E.; issued on Sep. 14, 1915) titled "Fence-post"; U.S. Pat. No. 1,263,132 (Inventor: Sharpe, G. C.; Issued on Apr. 16, 1918); U.S. Pat. No. 6,088,953 (Inventor: Morgan, W; Issued on Jul. 18, 2000) titled "Collapsible protective plant cover"; U.S. Pat. No. 6,014,837 (Inventor, Morgan, W.; Issued on Jan. 18, 2000) titled "Adaptable plant protector"; U.S. Pat. No. 7,377,020 (Inventors: Bartling, et al.; Issued on May 27, 2008) titled "Fence post bracing system"; U.S. Patent Application Publication Ser. No. 20060236620 (Inventor: LaCrosse, W.; Published on Oct. 26, 2006) titled "Ground anchor"; U.S. Patent Application Publication Ser. No. 20070062109 (Inventor: Jolley, W. B.; Published on Mar. 22, 2007) titled "Permanent underground staking system ad apparatus for vines and weakly rooted trees"; U.S. Patent Application Publication Ser. No. 20080271388 (Inventors: Bayly, et al.; Published on Nov. 6, 2008) titled "Anchoring stake"; and U.S. Patent Application Publication No. 20060243340 (Inventors: Wheeler, et al.; Published on Nov. 2, 2006) titled "Apparatus and method for attaching fencing material".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention, may be better understood with reference to the accompanying specification, wherein.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Methods recited herein may be carried out in any order of the recited events which is logically possible, as well as the recited order of events.

Figure 1A:
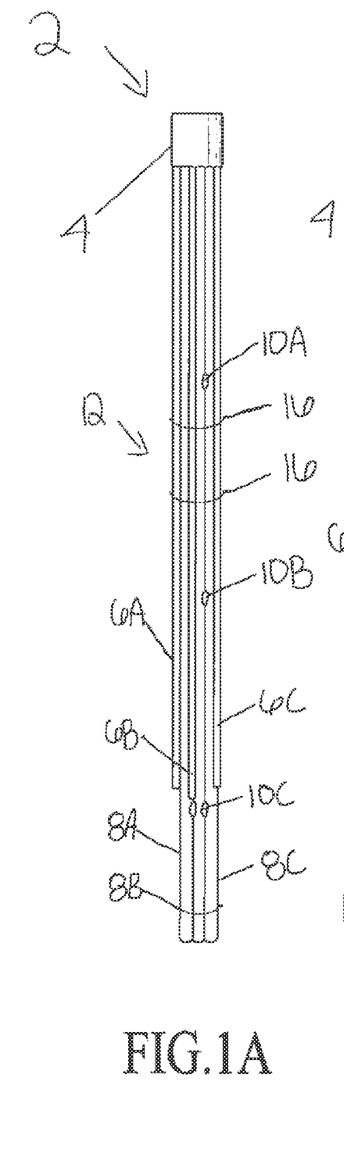
FIG. 1A is an illustration of a support device packaged for shipment.
Figures 1B, 1C:
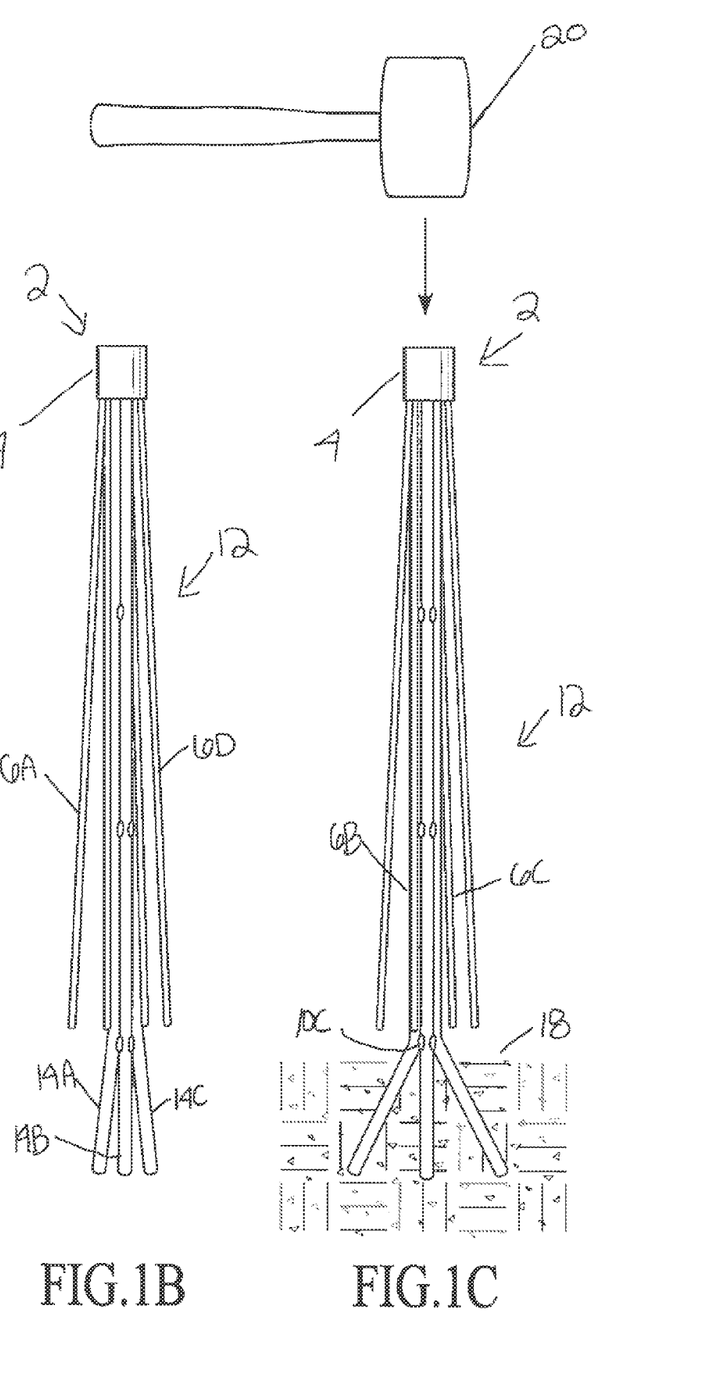
FIG. 1B is an illustration of the support device of FIG. 1A in an unpackaged state and ready for installation.
FIG. 1C illustrates the support device of FIGS. 1A and 1B after an installation in a ground material by means of application of force by a hammer to the elongate elements of the support device.

Referring now generally to the Figures and particularly to FIGS. 1A through 1C, FIG. 1A is an illustration of a support device 2 packaged for shipment. The support device 2 includes a collar 4 that couples four flexible arms 6A-6D and three elongate elements 8A-8C. The three elongate elements 8A-8C may be a rebar length that are each welded at several weld points 10A-10C to form a rigid post 12. An individual tine 14A-14C of each elongate element 8A-8C extends from a bottom weld 10C of the post 12. The flexible arms 6A-6D may also be made of rebar. One or more of the flexible support arms 6A-6D may be or comprise an organic plastic material, a non-organic plastic material, a metal such as aluminum, steel or iron, and/or a metal alloy. In one exemplary preferred embodiment of the present invention, one or more of the flexible support arms 6A-6D may comprise a length of steel, aluminum or iron rebar having a nominal diameter of 0.250 inch. The flexible arms 6A-6D are bound to the rigid post 12 and the tines 14A-14C are separately bound together with wire 16, or other suitable binding material known in the art to maintain the support device 2 in a reduced volume profile for shipment. Preferably, the flexible arms 6A-6D are shorter in length than the rigid post 12. More preferably, the flexible arms 6A-6C do not extend further from the collar 4 than the elongate elements 8A-8C when the support device 2 is packed for shipment.

One or more exemplary elongate elements 8A-8C of the rigid post 12 may each comprise an individual steel reinforcing bar, known as a rebar in the art, wherein each rebar preferably presents a length in the range from 0.5 foot to twelve feet and a cross-sectional diameter preferably in the range of from 0.25 inch to 2.0 inches. Each exemplary elongate element preferably presents an individual length in the range from one foot to four feet and an individual cross-sectional diameter preferably in the range of from 0.25 inch to 0.75 inch. The exemplary elongate elements 8A-8C most preferably have equal lengths along an elongate axis A. It is understood that certain alternate preferred embodiments of one or more elongate elements 8A-8C may comprise a length of number three U.S. imperial bar size rebar having a nominal diameter of 0.375 inch. It is further understood that certain alternate preferred embodiments of one or more elongate elements 8A-8C may comprise a length of metric size number ten rebar having a nominal diameter of 9.525 millimeters. The elongate elements 8A-8C each preferably exhibit a yield strength preferably in the range starting from 250 Newtons per square millimeter of area and extending to 500 Newtons per square millimeter of area. Alternatively or additionally, one or more first elongate elements 8A-8C may comprise a continuous length of (a.) American Society for Testing and Materials (hereinafter, "ASTM") A 615 Deformed and plain carbon-steel bars; (b.) ASTM A 706 Low-alloy steel deformed and plain bars; (c.) ASTM A 955 Deformed and plain stainless-steel bars; and/or (d.) ASTM A 996 Rail-steel and axle-steel deformed bars. The elongate elements 8A-8C are coupled together by welds to form the rigid post 12.

Alternatively or additionally, one or more elongate elements 8A-8C may be or comprise metal, a metal alloy, a solid metal material such as steel or aluminum, and/or a suitably rigid but malleable nonmetallic material known in the art. In certain still alternate embodiments of the present invention, one or more elongate elements 8A-8C may be shaped as a hollow tube, or alternatively partially hollowed in some fraction of total length.

It is understood that in alternate preferred embodiments the elongate elements 8A-8C and/or the flexible arms 6A-6D may consist of, or further comprise, alternatively or additionally other suitable materials known in the art beyond metal and rebar. It is understood that in alternate preferred embodiments the collar 4 may be or comprise metal, and alternatively or additionally plastic or other suitable materials known in the art other than metal. It is understood that in alternate preferred embodiments the collar 4, the elongate elements 8A-8C and the flexible arms 6A-6D may be coupled by other suitable means known in the art, such by application of an adhesive.

The tines 14A-14C form the post anchor end 12A and a top of the collar 4 forms a post striking end 12B.

Referring now generally to the Figures and particularly to FIGS. 1A through 1C, FIG. 1B is an illustration of the support device 2 of FIG. 1A in an unpackaged state and ready for installation. The wire 16 has been removed form the support device 2 and the tines 14A-14C are deployable into a ground element 18. The ground element may be or comprise topsoil, sand, agricultural ground, a geographic feature, a geological feature, and/or a synthetic foundation or earth surfacing material.

Referring now generally to the Figures and particularly to FIGS. 1A through 1C, FIG. 1C illustrates the support device 2 of FIGS. 1A and 1B after an installation in the ground element 18 by means of application of force by a hammer 20 to the elongate elements 8A-8C of the support device 2. The rigid post 12 has been driven into the ground element 18 by transference of a downward force from a hammer 20 and onto the collar 4. The received downward force has driven each tine 14A-14C into the ground element 18, and each tine 14A-14C has splayed away from the central post axis A of the rigid post 12 during the application of the downward force.

Figure 2:
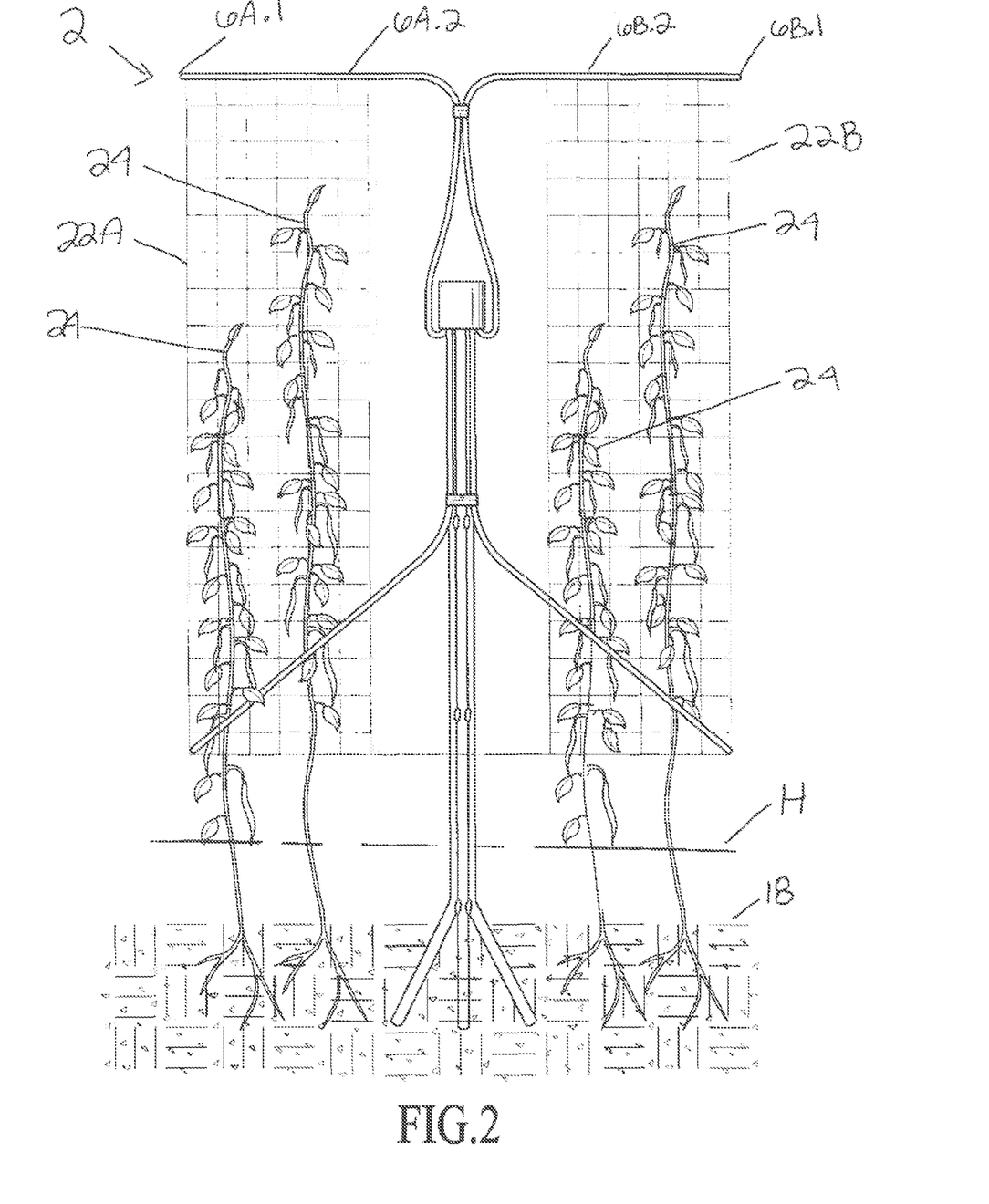
FIG. 2 shows the support device anchored in the ground element and having two pairs of arms separately configured to each support a separate length of trellis netting.

Referring now generally to the Figures and particularly to FIG. 2, FIG. 2 shows the support device 2 anchored in the ground element 18 and having two pairs of flexible arms 6A-6C & 6B-6D separately configured to each support and position a separate sheet of a trellis netting 22A & 22B. Individual vines 24 are shown extending from the ground element 18 and being supported by trellis netting 22. The two upward extending flexible arms 6A & 6B are bound together by a top binding element 26 to provide more stability to each of these two upward extending flexible arms 6A & 6B. The top binding element 26 may be plastic or metal wire or other suitable material for compressing the two upward extending flexible arms 6A & 6B together. Each pair of flexible arms 6A-6C & 6B-6D may act as tensioning elements to maintain a sheet of trellis netting under tension.

Each of the four flexible arms 6A-6D may be individually positioned to change its orientation in relation to the ground element 18 and the sun (not shown). The individual sheets of trellis netting 22A & 22B may thereby by oriented by the positioning of the respective flexible arm pairs 6A-6C & 6B-6D to orient the vines 24 as desired by a gardener or agricultural worker.

The trellis netting 22A & 22B may be permeable to air flow and may be or comprise one or more sheets of polyethylene mesh, trellis netting, Burpee Garden™ trellis netting marketed by W. Atlee Burpee & Co. of Warminster, Pa., Ross Deer Netting ™ deer netting material, a sheet of Wild Life Netting™, or other suitable netting or barrier material known in the art. Alternatively, the trellis netting 22A & 22B may be or comprise a solar energy collection fabric, such as, but not limited to, a thin film solar panel marketed by Nanosolar Corporation of San Jose, Calif. or a thin film solar panel marketed by First Solar Corporation of Tempe, Ariz. Still additionally or alternatively, the trellis netting 22A & 22B may be or comprise a plurality of string lengths 23.

A distal length 6A.1-6D.1 of each of one or more flexible arms 6A-6D extends approximately from a distal arm end 6A.2-6D.2. The distal length 6A.1-6D.1 of at least one arm 6A-6D may extend along a horizontal plane H plus or minus 10 degrees. Two or more distal lengths 6A.1-6D.1 of two or more arms 6A-6D may be co-planar within plus or minus 10 degrees of the horizontal plane H. One or more distal ends 6A.1-6D.1 of at least one arm 6A-6D may form a 90 degree angle within plus or minus 10 degrees in the horizontal plane H with at least one other distal length 6A.1-6D.1 of another flexible support arm 6A-6D. One or more distal length 6A.1-6D.1 of each arm 6A-6D is positionable within a 120 degree arc of the horizontal plane H. One or more distal length 6A.1-6D.1 preferably extends from within 0.25 inch of a distal arm end 6A.2-6D.2 of a same flexible support arm 6A-6D. One or more distal lengths 6A.1-6D.1 preferably extend from the top binding element 26 to a distal arm end 6A.2-6D.2.

Figure 3:
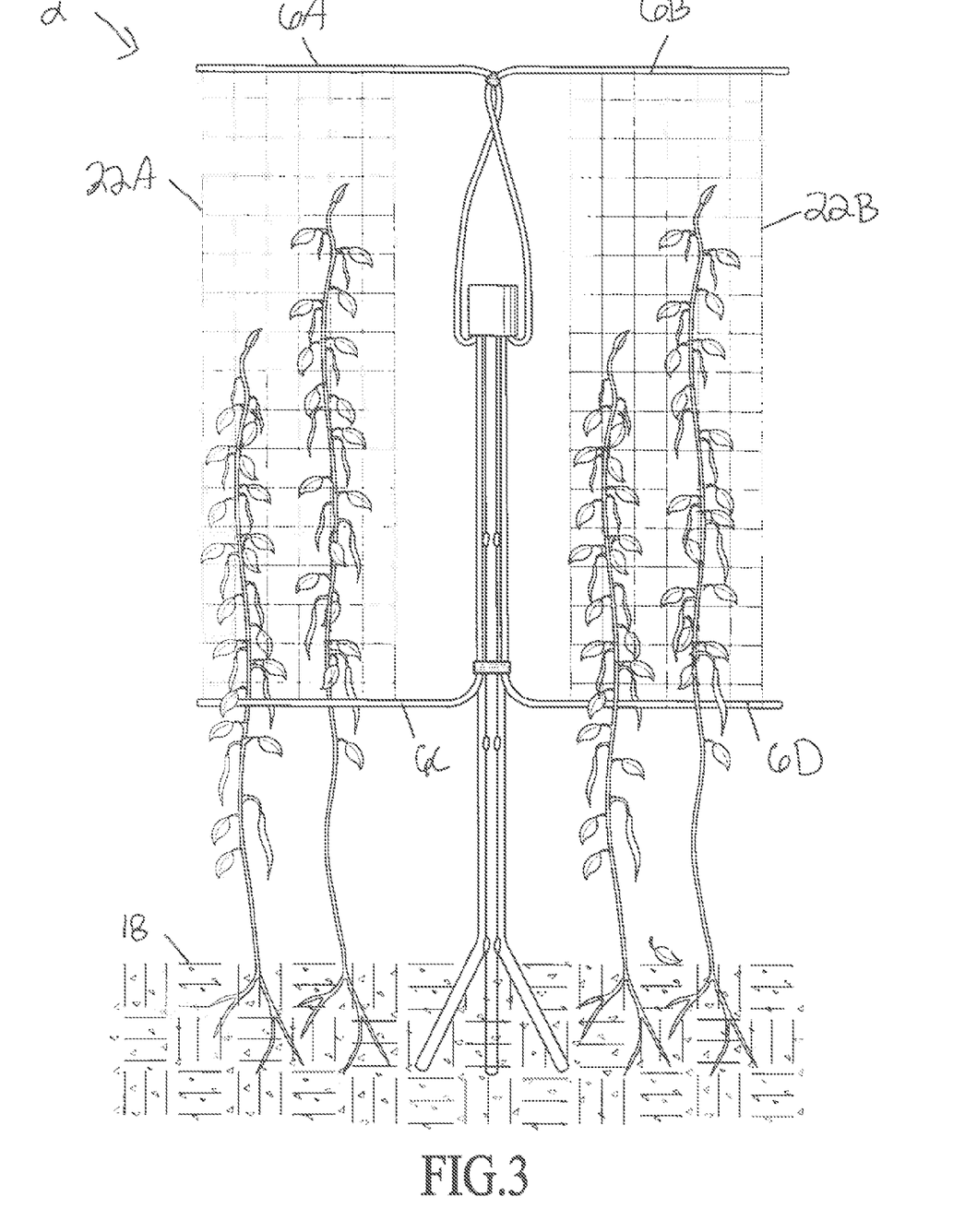
FIG. 3 shows the support device anchored in the ground element and having two pairs of arms separately configured to each support a separate length of trellis netting in a wider configuration than as shown in FIG. 3.

Referring now generally to the Figures and particularly to FIG. 3, FIG. 3 shows the support device 2 anchored in the ground element 18 and having two pairs of flexible arms 6A-6C & 6B-6D separately configured to each support a separate length of trellis netting 22A & 22B in a wider configuration then as shown in FIG. 3. Each pair of flexible arms 6A-6C & 6B-6D may optionally act as tensioning elements to maintain a sheet of trellis netting under tension.

The two upward extending flexible arms 6A & 6B are twisted about each other as well as bound together by the top binding element 26 to provide more stability to each of these two upward extending flexible arms 6A & 6B. Each of the lower flexible arms 6C & 6D of the flexible arm pairs 6A-6C & 6B-6D are positioned in an L shape, whereby the lower flexible arms 6C & 6D are coupled with each horizontal edge 28A & 28B of the separate sheets of trellis netting 22A & 22B to maintain and support the trellis netting 22A & 22B in tension.

It is understood that the trellis netting 22A & 22B may alternatively be or comprise a deer netting, a deer fencing, a barrier material, and/or a solar energy collection fabric, such as, but not limited to, a thin film solar panel marketed by Nanosolar Corporation of San Jose, Calif. or a thin film solar panel marketed by First Solar Corporation of Tempe, Ariz.

Figure 4:
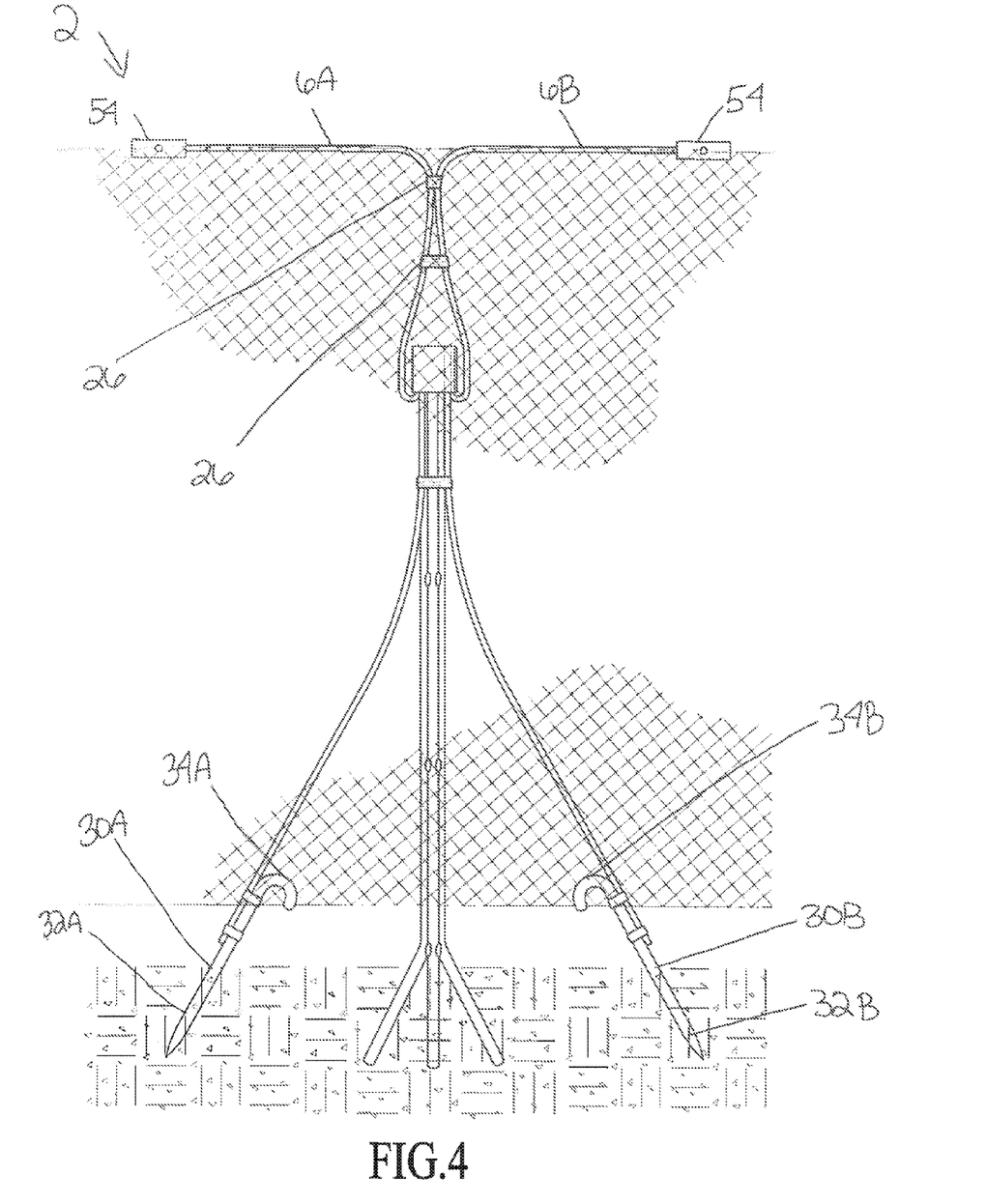
FIG. 4 shows the support device anchored in the configuration of FIG. 2 and additionally having ground coupling hooked elements attached to the two lower positioned arms.

Referring now generally to the Figures and particularly to FIG. 4, FIG. 4 shows the support device 2 anchored in the configuration of FIG. 2 and additionally having ground coupling extension elements 30A & 30B, or hooked elements 30A & 30B, attached to the two lower positioned flexible arms 6C & 6D. A ground length 32A & 32B of each hooked element 30A & 30B extend into the ground element 18 and a hook length 34A & 34B of each hooked element 30A & 30B extends above the ground element 18. Each hooked element 30A & 30B is coupled with a single lower positioned flexible arm 6C & 6D by a hook binding element 36A-36D, such as wire metal, string, cord or rope. Trellis netting 22A or a fence material 38 may be coupled with one or more hooked elements 30A & 30B by insertion of a hook length 34A & 34B through the trellis netting 22A or fence material 38. The two upward extending flexible arms 6A & 6B are bound together by two separate top binding elements 26 to provide more stability to each of these two upward extending flexible arms 6A & 6B. Each pair of flexible arms 6A-6C & 6B-6D may act as tensioning elements to maintain a sheet of trellis netting 22A & 22B under tension.

Figure 5:
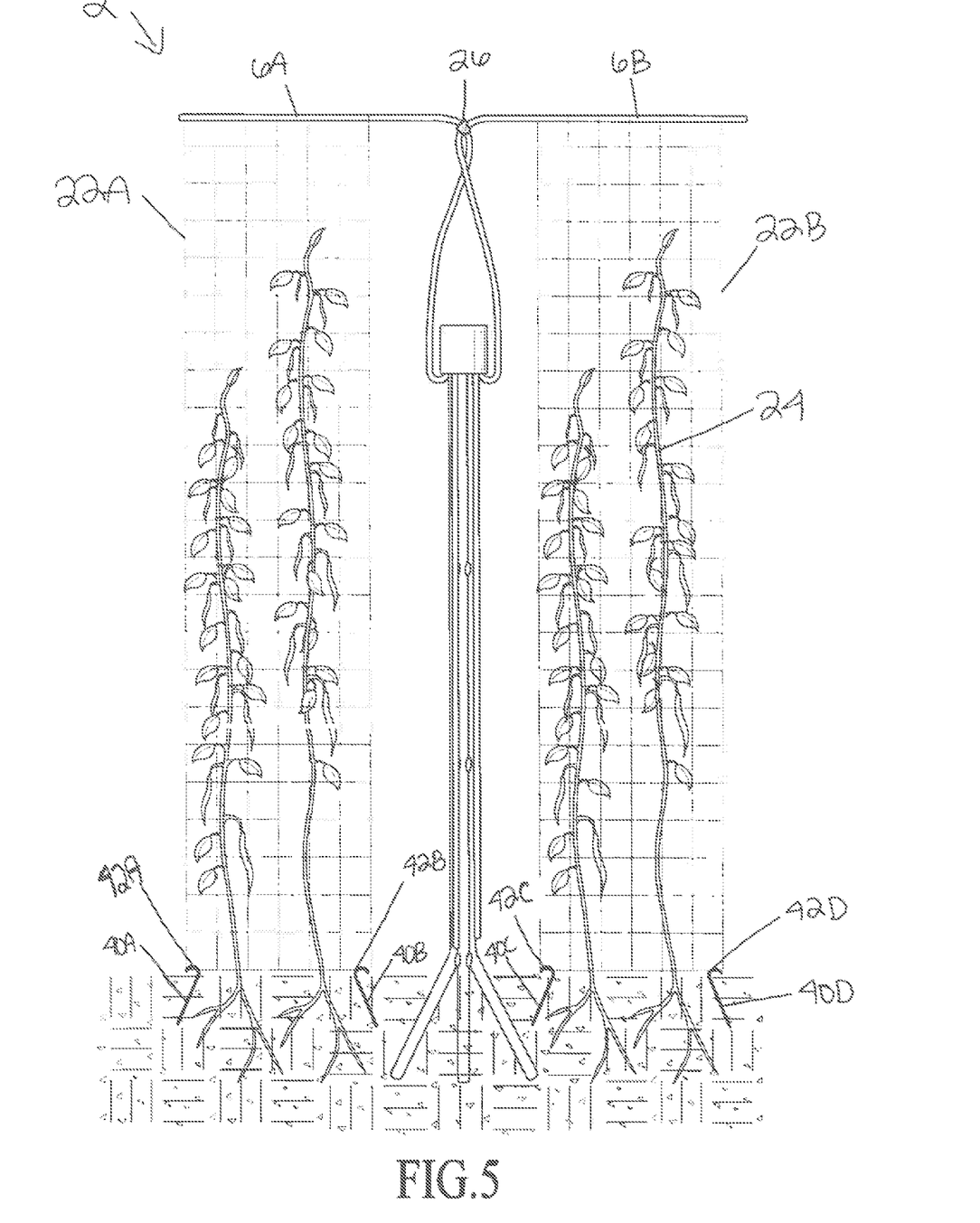
FIG. 5 shows the support device anchored in the ground element and having only two arms deployed horizontally wherein each arm supports a separate length of trellis netting and each length of trellis netting is coupled to the ground with secondary hooked elements.

Referring now generally to the Figures and particularly to FIG. 5, FIG. 5 shows the support device 2 anchored in the ground element 18 and having only two flexible arms 6A & 6B deployed horizontally wherein each upper arm 6A & 6B supports a separate length of trellis netting 22A & 22B and each length of trellis netting 22A & 22B is coupled to the ground with one or more secondary hook elements 40A-40D. The two upward extending flexible arms 6A & 6B are twisted about each other as well as bound together by the top binding element 16 to provide more stability to each of these two upward extending flexible arms 6A & 6B. Each secondary hook element 40A-40D has a curved length 42A-42D that extends through and captures one of the sheets of trellis netting 22A & 22B. Each secondary hook element 40A-40D is further partially driven into the ground element 18. One or more trellis netting 22A & 22B may be maintained in tension between tensioning elements, e.g., an upward extending flexible arm 6A & 6B and one or more secondary hook elements 40A-40D.

Figure 6:
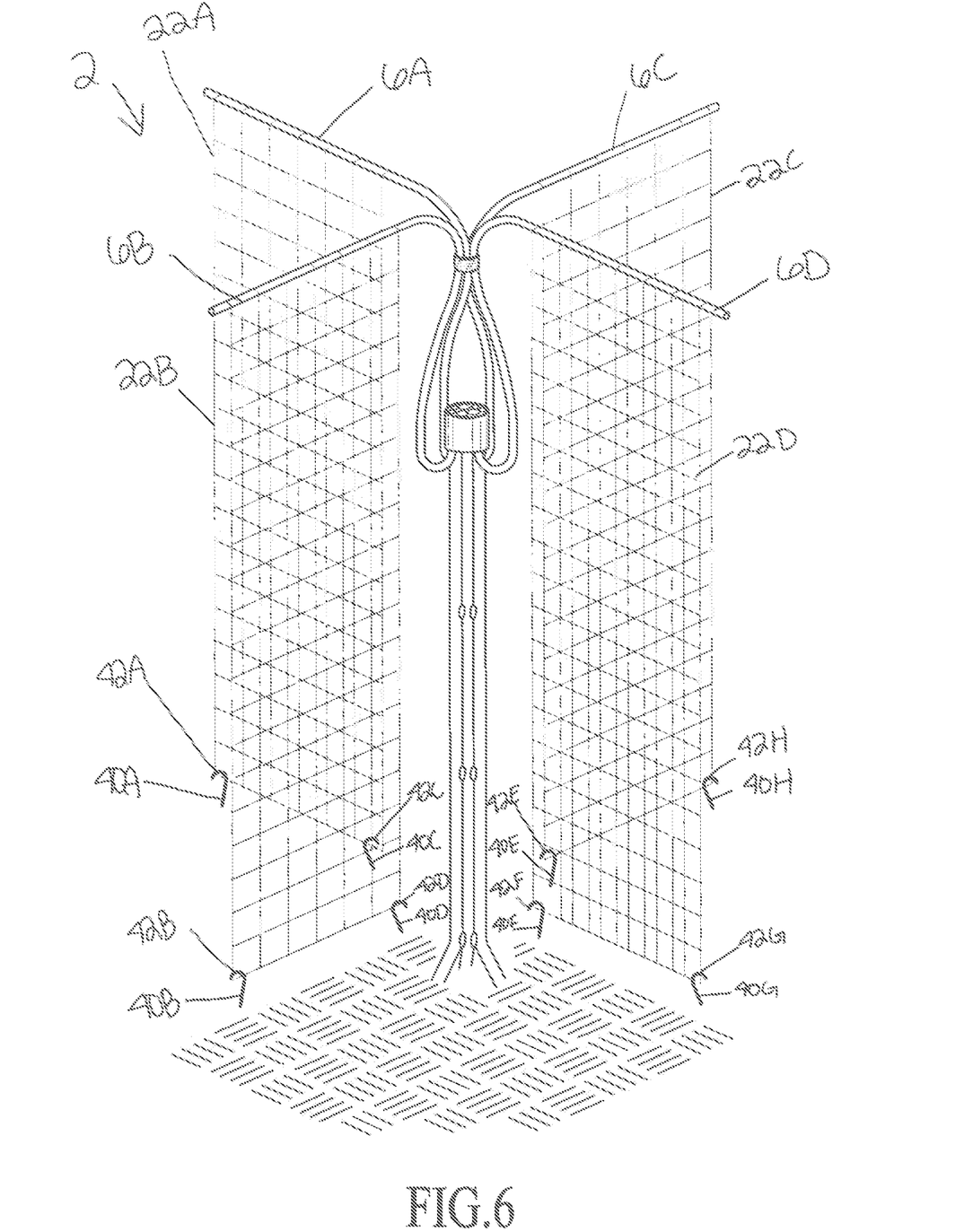
FIG. 6 shows the support device anchored in the ground element and having all four arms deployed horizontally wherein each arm supports a separate length of trellis netting and each length of trellis netting is coupled to the ground with secondary hooked elements.

Referring now generally to the Figures and particularly to FIG. 6, FIG. 6 shows the support device 2 anchored in the ground element 18 and having all four flexible arms 6A-6D deployed horizontally wherein each flexible arm 6A-6D supports a separate length of trellis netting 22A-22D and each length of trellis netting is coupled to the ground with secondary hook elements 40A-40H. The four upward extending flexible arms 6A-6D are bound together by the top binding element 26 to provide more stability to each of these two upward extending flexible arms 6A-6C. Each secondary hook element 40A-40H has a curved length 42A-42H that extends through and captures a separate sheet of trellis netting 22A-22D. Each secondary hook 40A-40H element is further partially driven into the ground element 18. One or more trellis netting 22A-22B may be maintained in tension between tensioning elements, e.g., an upward extending flexible arm 6A-6D and one or more secondary hook elements 40A-40H.

Figure 7:
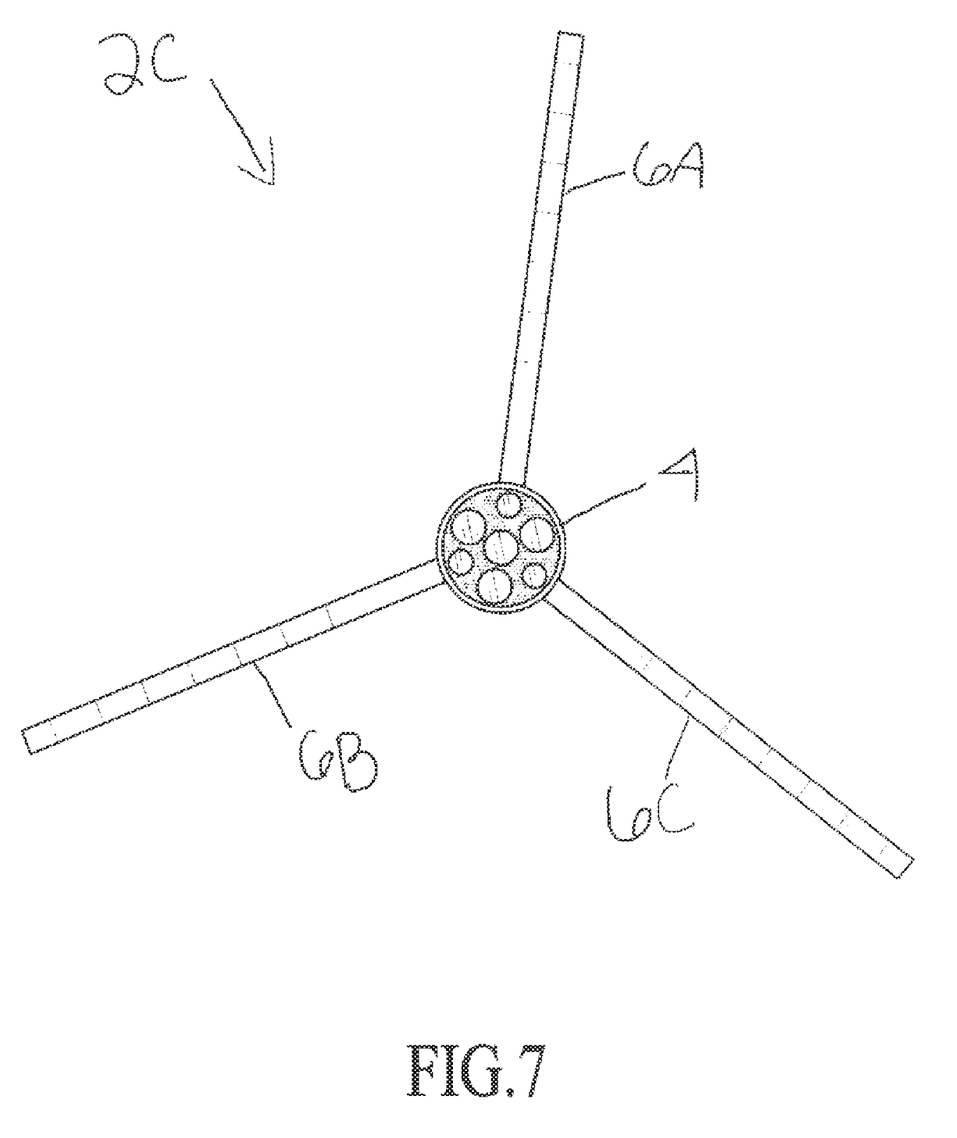
FIG. 7 is a top view of a variation of the support device wherein the support device comprises only three flexible support arms.

Referring now generally to the Figures and particularly to FIG. 7, FIG. 7 is a top view of a variation of the support device 2 wherein the support device 2 comprises only three flexible arms 6A-6C. Each of these three flexible arms 6A-6C may be shaped by a gardener or other agricultural worker to support a trellis netting 22A-22C and/or hold a trellis netting 22A-22C under tension.

Figure 8A:
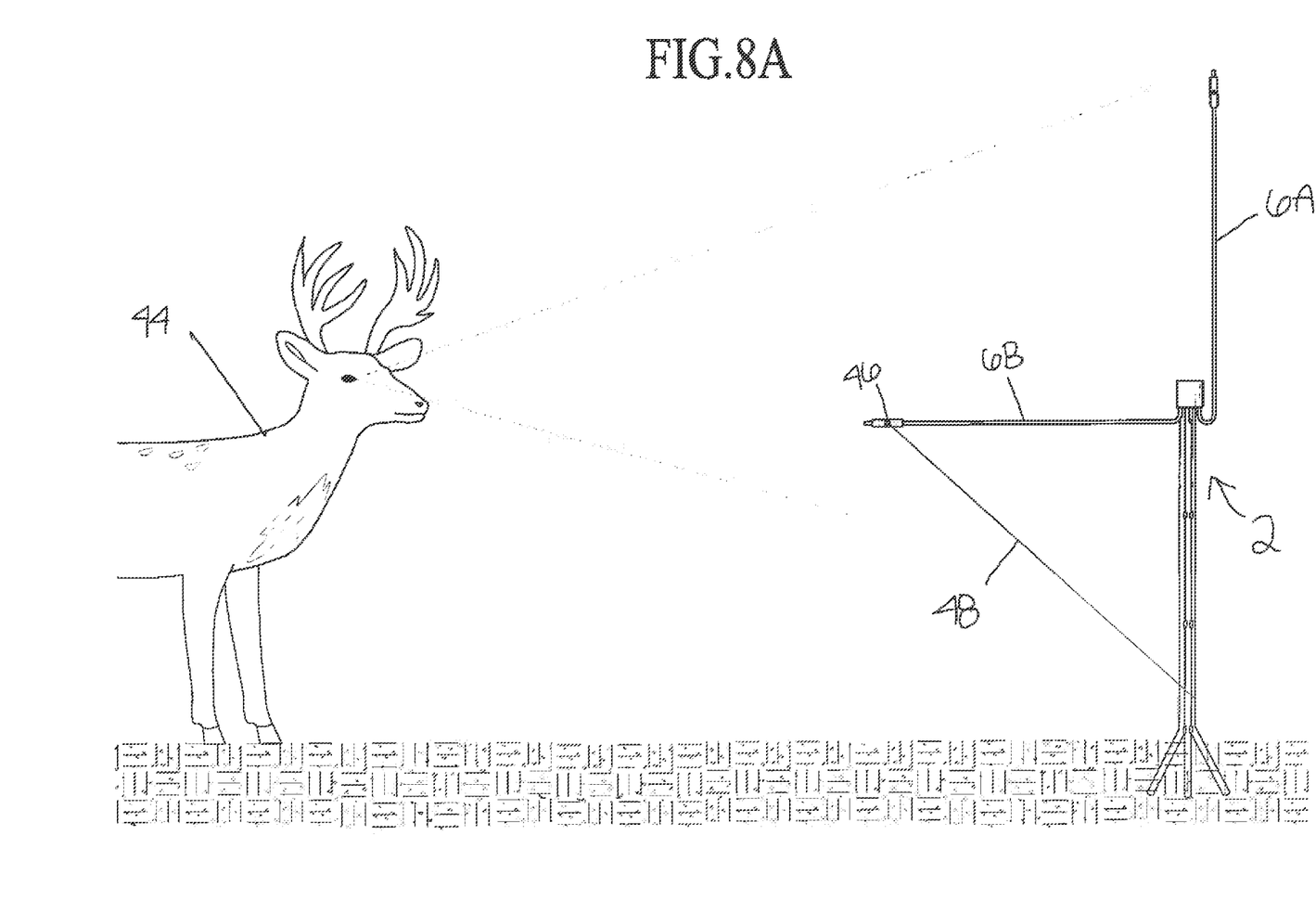
FIG. 8A is a side view of the support device wherein one flexible arm is extended vertically and another vertical arm is extended horizontally, whereby each of these two arms deters animal intrusion.
Figure 8B:
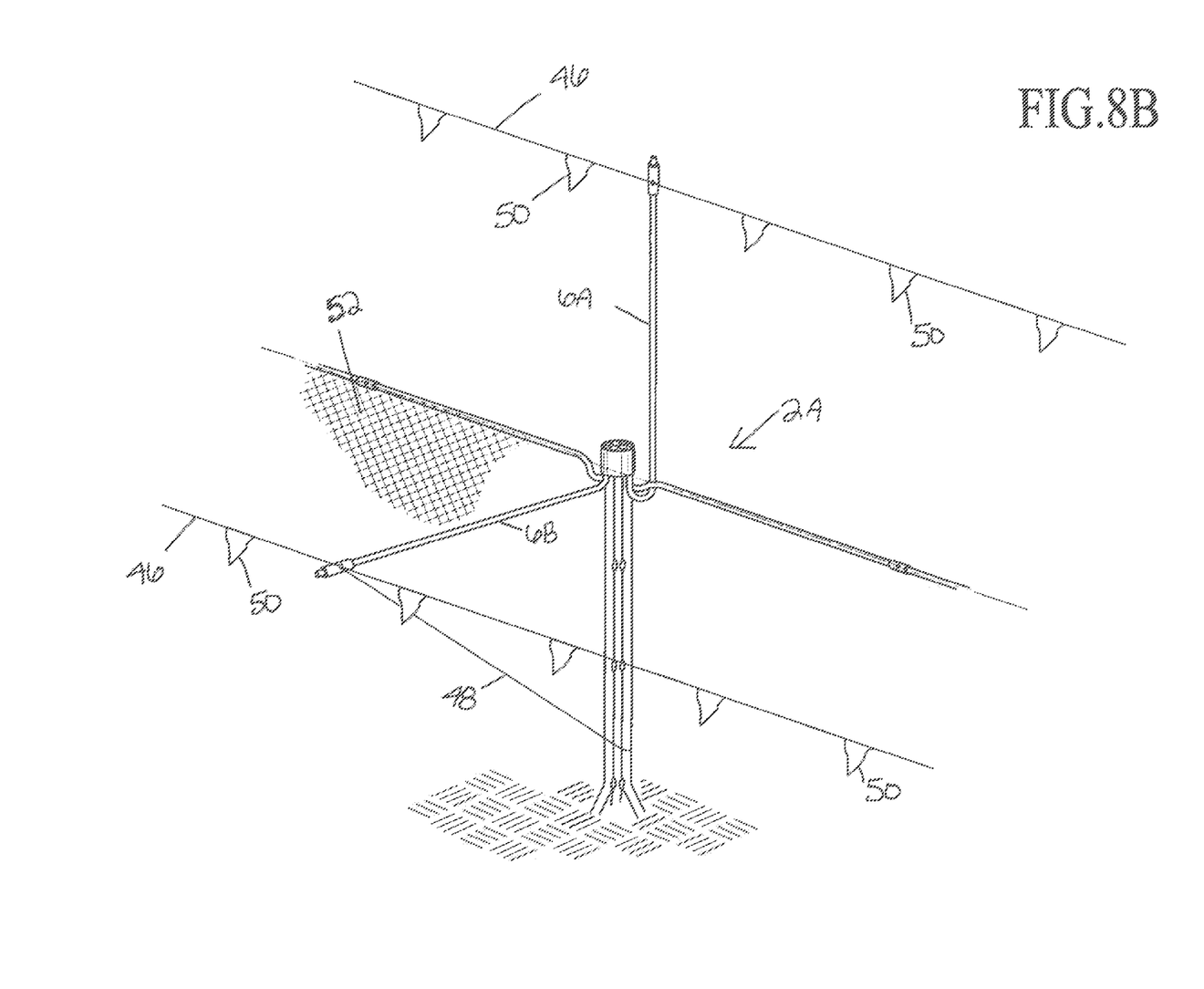
FIG. 8B is a perspective view of the support device of FIGS. 1A-1C in the orientation of FIG. 8A and wherein two arms are each supporting a string bearing flags.

Referring now generally to the Figures and particularly to FIG. 8A and FIG. 8B, FIG. 8A is side view of the support device 2 in use to deter animal intrusion. A first flexible arm 6A is extended substantially vertically to present a visible vertical deterrence to a deer 44, and a second flexible arm 6B is extended substantially horizontally to support a linear element 46, as shown in FIG. 8B, that forms a horizontal barrier that is also intended to be visible to the deer 44.

A tensioned element 48, or tensioned wire 48, is attached to the rigid post 12 and the horizontally positioned second flexible arm 6B. The tensioned wire 48 may be in tension and pull the second flexible arm 6B both downward and toward the rigid post 12.

The tensioned wire 48 may be or comprise a plastic polymer, iron, steel, aluminum or copper or other suitable material known in the art, and is preferably sized as within the range of Wire Number One to Ten, i.e., the range of American Wire Gage from 0.289 inches to 0.102 inches.

Referring now generally to the Figures and particularly to FIG. 8A and FIG. 8B, FIG. 8B is a perspective view of the support device 2 of FIGS. 1A-1C in the orientation of FIG. 8A and wherein the first flexible arm 6A and the second flexible arm 6B are each separately supporting a linear element 46 that is bearing flags 50. The linear elements 46 and the attached flags 50 increase the intrusion deterrent effectiveness of the supporting device 2 by creating a more visible barrier for perception by the deer 44 and other animals. The remaining two flexible arms 6C & 6D of the supporting device 2 extend substantially horizontally and orthogonally to the second flexible arm 6B, and are both coupled to a sheet material 52, such as a barrier material. The sheet material 52 may be or comprise one or more sheets of polyethylene mesh, trellis netting, Burpee Garden™ trellis netting marketed by W. Atlee Burpee & Co. of Warminster, Pa., Ross Deer Netting™ deer netting material, a sheet of Wild Life Netting™, or other suitable netting or barrier material known in the art.

Alternatively or additionally, either or both linear elements 46 may be or comprise an organic threaded line, a plastic polymer, iron, steel, aluminum or copper or other suitable material known in the art, and is preferably sized as within the range of Wire Number One to Ten, i.e., the range of American Wire Gage from 0.289 inches to 0.102 inches. Alternatively or additionally, one or more flags 50 may be or comprise strips or portions of metal, plastic, fabric, or light emitting devices.

Figure 9:
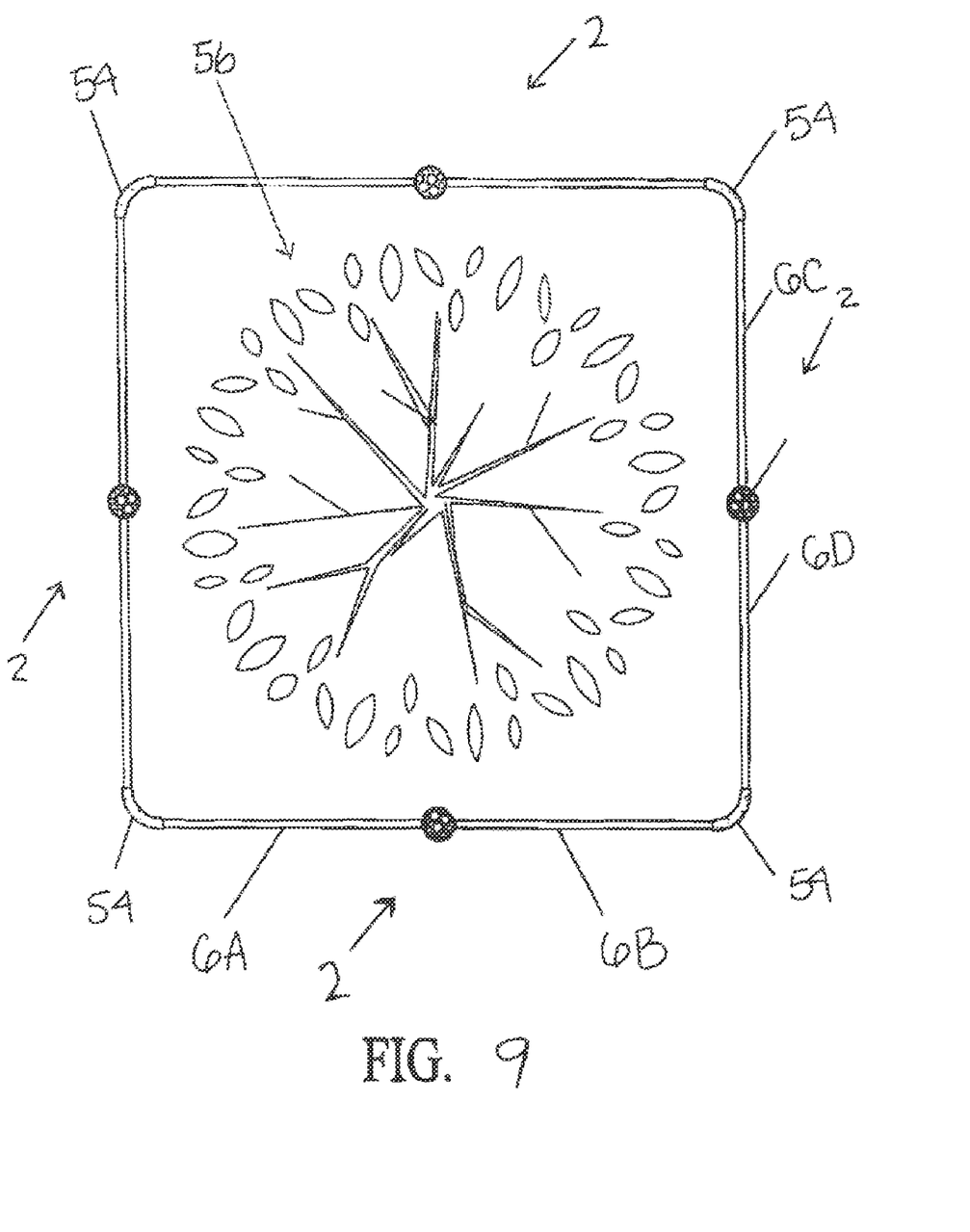
FIG. 9 is a top view of a plurality of support devices of FIGS. 1A-1C coupled in series to surround and protect a tree.

Referring now generally to the Figures and particularly to FIG. 9, FIG. 9 is a top view of a plurality of support devices 2 coupled in series. Four rigid posts 12 are partially driven into the ground element 18 and selected flexible arm 6A-6D is coupled to a flexible arm 6A-6D of a neighboring support device 2 by insertion into a tubular coupler 54. The plurality of support devices 2 are thereby configured to fully enclose a tree 56.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above

I claim:

1. A device comprising:
    a post having a first elongate element and a second elongate element, the first elongate element comprising a first solid cylindrical body having a first tine and a first striking end, the second elongate element comprising a second solid cylindrical body having a second tine and a second striking end, wherein the first elongate element and the second elongate element are coupled in at least one location between the tines and the striking ends, wherein the post has a first state wherein the first tine and the second tine are substantively parallel along an elongate axis, and the post has an alternate second state wherein the first tine and the second tine are splayed and angle away from the elongate axis, wherein the first tine and the second tine form a post anchor end, and the first striking end and the second striking end form a post striking end;
    at least four arms, wherein a first arm and a second arm extend upwards from the post striking end, and a third arm and a fourth arm extend downwards from the post striking end;
    a binding element, the binding element gathering the first arm and the second at a midpoint of the first arm and the second arm;
    a first trellis net, the first trellis net extending from the first arm and to the third arm; and
    a second trellis net, the second trellis net extending from the second arm and to the fourth arm, whereby a plant may grow vertically upwards along either of the trellis nets towards an arm.

2. The device of claim 1, wherein each arm is no longer than the post.

3. The device of claim 1, wherein the first trellis net is maintained under tension between the first arm and the third arm.

4. The device of claim 1, further comprising a lower binding element, the lower binding element maintaining the third arm and the fourth arm in compression against the post.

5. The device of claim 1, wherein the first arm extends along the horizontal plane plus or minus 10 degrees from a distal end of the first arm and toward the binding element.

6. The device of claim 1, wherein the third arm extends along the horizontal plane plus or minus 10 degrees from a distal end of the third arm and toward the post.

7. The device of claim 1, wherein the first trellis net is maintained under tension between the first arm and the third arm.

8. The device of claim 1, wherein at least one trellis net comprises a sheet of material.

9. The device of claim 1, wherein at least one trellis net comprises a plurality of string lengths.

* * * * *